US012627653B2

(12) United States Patent
Tiwari et al.

(10) Patent No.: US 12,627,653 B2
(45) Date of Patent: May 12, 2026

(54) SECURED DIRECT ACCESS FOR CUSTOMER SERVICE

(71) Applicant: Rubrik, Inc., Palo Alto, CA (US)

(72) Inventors: Rishabh Tiwari, Bangalore (IN); Vyankatesh Sawalapurkar, Bangalore (IN); Hao Wu, Santa Clara, CA (US); Falak Kansal, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 182 days.

(21) Appl. No.: 18/404,190

(22) Filed: Jan. 4, 2024

(65) Prior Publication Data

US 2025/0227105 A1 Jul. 10, 2025

(51) Int. Cl.
*H04L 9/40* (2022.01)

(52) U.S. Cl.
CPC ...... *H04L 63/0838* (2013.01); *H04L 63/0884* (2013.01)

(58) Field of Classification Search
CPC .... H04L 9/40; H04L 63/0838; H04L 63/0884
See application file for complete search history.

(56) References Cited

U.S. PATENT DOCUMENTS

| 9,635,028 | B2 * | 4/2017 | Shepard | .................. G06F 21/44 |
| 11,665,166 | B2 | 5/2023 | Dynkin et al. | |

| 2013/0074179 | A1 * | 3/2013 | Das | .......................... G06F 9/452 |
| | | | | 726/18 |
| 2019/0102162 | A1 | 4/2019 | Pitre et al. | |
| 2019/0132307 | A1 * | 5/2019 | Pitchaimani | ......... A61C 9/0066 |
| 2020/0302446 | A1 | 9/2020 | Kledaras et al. | |
| 2022/0294817 | A1 | 9/2022 | Parekh et al. | |
| 2022/0353266 | A1 | 11/2022 | Ramamurthi et al. | |
| 2024/0144269 | A1 | 5/2024 | Szigeti et al. | |

FOREIGN PATENT DOCUMENTS

| EP | 3622427 B1 * | 3/2025 | ............. H04L 67/02 |

* cited by examiner

*Primary Examiner* — Jayesh M Jhaveri
(74) *Attorney, Agent, or Firm* — Holland & Hart LLP

(57) ABSTRACT

Methods, systems, and devices for data management are described. Authorization may be received, from a user of a customer of an operator of a first computing system, to access an instance of a first application running at the first computing system for the customer via a user account for the customer. Based on receiving the authorization, a request from a user of the operator to access a second application associated with generating a one-time credential associated with the user account may be received. The second application may run at the first computing system. Based on authenticating the user of the operator for access to the second application, the one-time credential may be provided to the user of the operator, which may use the one-time credential to gain temporary access to the instance of the first application via the user account.

20 Claims, 7 Drawing Sheets

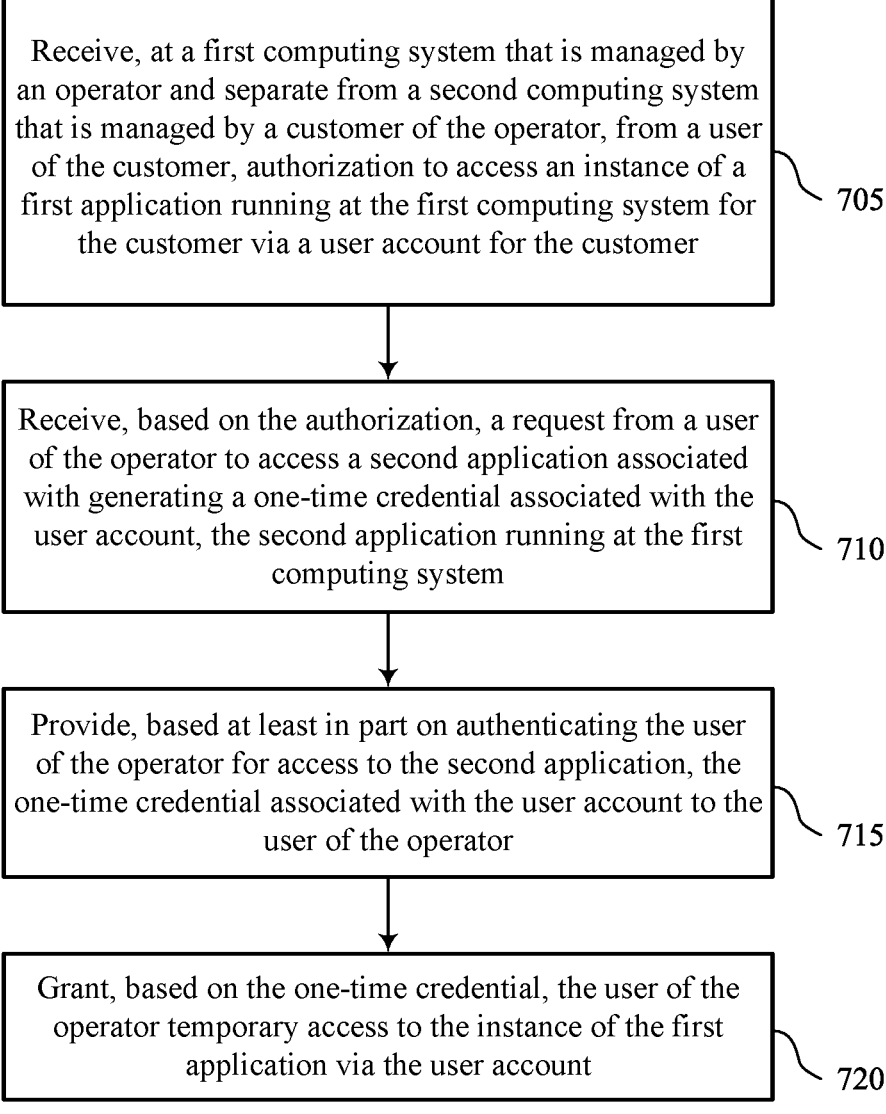

Receive, at a first computing system that is managed by an operator and separate from a second computing system that is managed by a customer of the operator, from a user of the customer, authorization to access an instance of a first application running at the first computing system for the customer via a user account for the customer

705

Receive, based on the authorization, a request from a user of the operator to access a second application associated with generating a one-time credential associated with the user account, the second application running at the first computing system

710

Provide, based at least in part on authenticating the user of the operator for access to the second application, the one-time credential associated with the user account to the user of the operator

715

Grant, based on the one-time credential, the user of the operator temporary access to the instance of the first application via the user account

SECURED DIRECT ACCESS FOR CUSTOMER SERVICE

FIELD OF TECHNOLOGY

The present disclosure relates generally to data management, including techniques for secured direct access for customer service.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 7 shows a flowchart illustrating methods that support secured direct access for customer service in accordance with aspects of the present disclosure.

DETAILED DESCRIPTION

Figure 1:
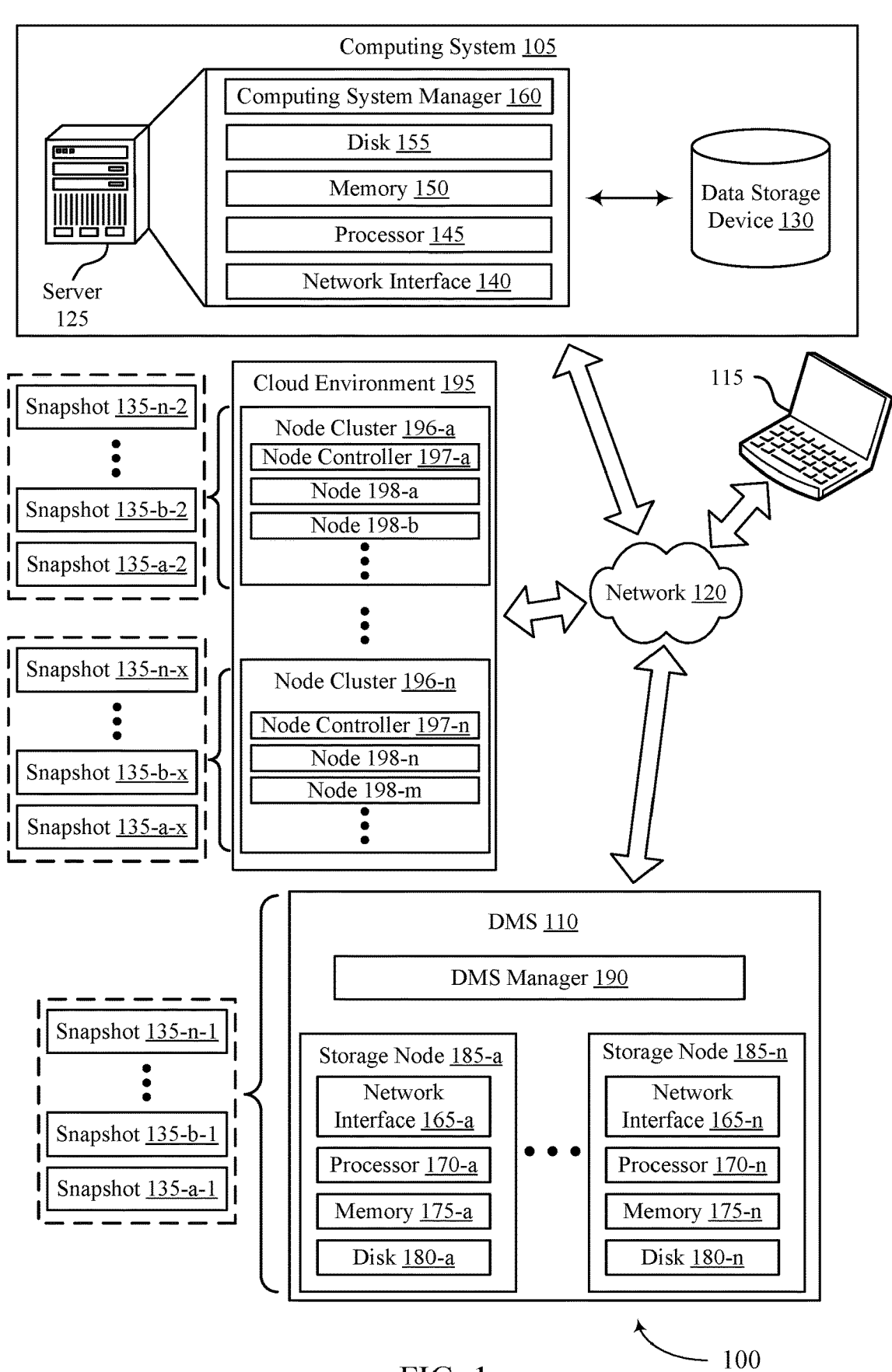
FIG. 1 illustrates an example of a computing environment that supports secured direct access for customer service in accordance with aspects of the present disclosure.

When providing support to a user of a software-as-a-service (SaaS) application, a support entity may be unable to observe, first-hand, the instance of the SaaS application (e.g., the user interface, the configurations of the instance of the SaaS application tailored to the computing system of the customer, etc.) being interacted with by a user of a customer. Moreover, in some cases, the description provided by the user may suffer inaccuracies or omit important details.

Accordingly, to understand the issues being seen by a particular customer with a particular instance of a SaaS application, troubleshooting may involve using communication means that are limited to providing a support entity with an incomplete understanding of the issue being experienced by the user, which may significantly extend a time used to resolve a customer issue and may consume excessive amounts of engineering time. Thus, mechanisms (e.g., methods, systems, apparatuses, techniques, configurations, components) that support providing a support entity with the complete and accurate details of the issue being experienced by a customer with the particular instance of the SaaS application may be desired.

To provide a support entity of a provider of a SaaS application with the complete and accurate details of an issue being experienced by a customer with an instance of the SaaS application running for the customer, this disclosure describes a procedure that enables the support entity of the provider to temporarily access the instance of the SaaS application. The disclosure further describes a procedure that enables the support entity to impersonate a user of the customer that is requesting the support while accessing the instance of the SaaS application such that the support entity is provided access to a mirrored version of the instance of the SaaS application experienced by the user—e.g., a copy that reflects the configurations (e.g., user interface (UI) and internal configurations) of the customer and the computing environment of the customer. In some examples, this disclosure describes a procedure for creating a system-level user account (which may be referred to as a support user account) of the customer through which a support entity can temporarily access (e.g., from a device external to the computing environment of the customer) the instance of the SaaS application running for the customer in accordance with the permissions, configurations, or both, of the user requesting support such that requests sent by the support entity (via the support user) are processed by the SaaS application as though the support entity is the user requesting support.

To support providing a support entity of a provider of a SaaS application with the ability to access an instance of the SaaS application running for a customer (e.g., while fully impersonating a user of the customer), this disclosure further describes robust security measures to prevent malicious actors from using this impersonation capability for fraudulent means. For example, this disclosure describes a procedure for securely provisioning, to support entities of the provider, a one-time credential via an administrative console of the provider that enforces internal support entity permissions, provides a portal for inputting the one-time credentials that can only be accessed internal to the network of the SaaS application provider, and provides a mechanism that continuously confirms (e.g., on a per-request basis) that access to the instance of the SaaS application is authentic and permitted.

FIG. 1 illustrates an example of a computing environment 100 that supports secured direct access for customer service in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random-access memory (RAM), static random-access memory (SRAM), dynamic random-access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-intime version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Software-as-a-service (SaaS) applications provide a mechanism for a software provider to deliver software applications to customers over a data network (such as the Internet) as a service, rather than as a product. That is, instead of providing a software application in productized instances of the software application (e.g., in compact disc formats, in Internet-downloaded formats, etc.) to customers—where each customer (and a computing system of the user) is responsible for installing, executing, and maintaining a respective instance of the software application running at a respective computing system—a software provider may install, execute, and maintain customer-specific instances of the software application at a cloud-based computing system that is managed by the software provider. In such cases, to use the software product, customer (or users of the customer) may instead access, from respective computing system via a data network, respective instances of the software application running (e.g., primarily) at the cloud-based computing system. In some examples, an access of a customer to an instance of the software application running for the customer is via a subscription.

A SaaS application may thus be accessed by many customers, and therefore may be deployed to a wide variety of unique computing environments. Also, in some examples, different instances of the SaaS application may be customized to the different preferences and computing environments of these customers. Computing environment variability, user-customization, or both, may increase a complexity associated with troubleshooting (e.g., by a provider of the SaaS application) an issue being experienced by a customer—e.g., because an entity (e.g., a user, an employee, an engineer, a support technician of a provider of the SaaS application, a computer-based support function, etc.) providing support for the SaaS application (which may be referred to as a support entity) may be unaware of the particular configuration of the instance of the SaaS application being provided to a customer. In some examples, a phone call or online messaging application (e.g., email or chat) may enable a support entity to obtain a description of the issue from a user of the SaaS application.

However, the support entity may be unable to observe, first-hand, the instance of the SaaS application (e.g., the user interface, the configurations of the instance of the SaaS application tailored to the computing system of the customer, etc.) being interacted with by a user of the customer. Moreover, in some cases, the description provided by the user may suffer inaccuracies or omit important details. In some examples, screen sharing applications may enable a support entity to observe the instance of the SaaS application being accessed by a user but may not enable the support entity to exercise control over the instance of the SaaS application. In yet other examples, a remote desktop application may enable a support entity to observe and control the SaaS application via a device of the user but may not enable the support entity to fully capture the functioning of the instance (e.g., the underlying processes of the browser or device running the instance). Moreover, some users may prefer not, or be unable (e.g., due to firewall protections), to provide remote access to the support entity.

Accordingly, to understand the issues being seen by a particular customer with a particular instance of a SaaS application, troubleshooting may involve using communication means that are limited to providing a support entity with an incomplete understanding of the issue being experienced by the user, which may significantly extend a time used to resolve a customer issue and may consume excessive amounts of engineering time. Thus, mechanisms (e.g., methods, systems, apparatuses, techniques, configurations, components) that support providing a support entity with the complete and accurate details of the issue being experienced by a customer with the particular instance of the SaaS application may be desired.

To provide a support entity of a provider of a SaaS application with the complete and accurate details of an issue being experienced by a customer with an instance of the SaaS application running for the customer, this disclosure describes a procedure that enables the support entity of the provider to temporarily access the instance of the SaaS application. The disclosure further describes a procedure that enables the support entity to impersonate a user of the customer that is requesting the support while accessing the instance of the SaaS application such that the support entity is provided access to a mirrored version of the instance of the SaaS application experienced by the user—e.g., a copy that reflects the configurations (e.g., UI and internal configurations) of the customer and the computing environment of the customer. In some examples, this disclosure describes a procedure for creating a system-level user account (which may be referred to as a support user account) of the customer through which a support entity can temporarily access (e.g., from a device external to the computing environment of the customer) the instance of the SaaS application running for the customer in accordance with the permissions, configurations, or both, of the user requesting support such that requests sent by the support entity (via the support user) are processed by the SaaS application as though the support entity is the user requesting support.

In some examples, a DMS 110 may generate a user account (e.g., an administrative account, a user account, etc.) for a customer of an operator of the DMS 110, where the user account may enable a user (e.g., an administrator) of the customer to access an instance of a first application (e.g., the SaaS application) running for the customer at the DMS 110 (e.g., using compute, networking, and memory resources of the DMS 110). In some examples, the operator of the DMS 110 may manage the DMS 110 separate from a second computing system that is managed by the customer. In some examples, the first application supported by the DMS 110 may be used to manage (e.g., protect, restore, analyze, etc.) data of the customer. In some examples, the instance of the first application that is presented to the user of the customer may be customized to the computing system of the customer, preferences of a user of the customer, or both—e.g., based on the computing resources in the computing system managed by the customer, based on configurations (e.g., user-level settings, such as graphical user interface settings, and system-level settings) set by the user of the customer for the first application, etc. In some examples, the user of the customer may experience a support issue while interacting with the first application.

In some examples, the DMS 110 may also generate a system-level user account (which may be referred to as a support user account) for a customer of an operator of the DMS 110, where the system-level user account may enable a user (e.g., a support technician) of the operator of the DMS 110 to access the instance of the first application running for the customer. In some examples, the system-level user account may be generated as part of an initialization procedure for the first application. In other examples, the system-level user account may be generated after an initialization procedure for the first application—e.g., at a time when a user of the customer enables a support user functionality, at a time when a user of the customer requests support, etc.

In some examples, the DMS 110 may enable the system-level user account—e.g., in response to an authorization from the user of the customer. In some examples, the DMS 110 may enable the system-level user account as part of the procedure for generating the system-level user account—e.g., if the system-level user account is generated in response to a support request. Based on enabling the system-level user account, the DMS 110 may provide the support technician access (e.g., on a temporary basis) to the instance of the first application running for the customer via the system-level user account. In some examples, the system-level user account may enable the support technician to impersonate the user of the customer (with view permissions, read-only permissions, read/write permissions, etc.) while accessing the instance of the first application. For example, the DMS 110 may respond to requests received via the system-level user account as though the requests were received from the user account of the customer itself—e.g., in accordance with the resources of the computing system of the customer available to the user of the customer, the configurations of the first application set by the user of the customer, the services of the first application that are available to the user of the customer, and the like, that are presented via a user portal for the user of the customer.

By enabling a support entity to access an instance of a SaaS application running for a customer as well as to fully impersonate a user of the customer, a support entity may be able to obtain a complete and accurate picture of the issue being reported by a user of the customer while troubleshooting the issue. Further, by providing a support entity with complete and accurate information, a time for resolving a customer-reported issue may be significantly decreased.

To support providing a support entity of a provider of a SaaS application with the ability to access an instance of the SaaS application running for a customer (e.g., while fully impersonating a user of the customer), this disclosure further describes robust security measures to prevent malicious actors from using this impersonation capability for fraudulent means. For example, this disclosure describes a procedure for securely provisioning, to support entities of the provider, a one-time credential via an administrative console of the provider that enforces internal support entity permissions, provides a portal for inputting the one-time credentials that can only be accessed internal to the network of the SaaS application provider, and provides a mechanism that continuously confirms (e.g., on a per-request basis) that access to the instance of the SaaS application is authentic and permitted.

In some examples, a DMS 110 may receive, from a user of a customer of an operator of the DMS 110 (e.g., from a user of the customer), authorization for a user (which may be a support technician) of the DMS 110 to access an instance of a first application (e.g., the SaaS application) running for the customer at the DMS 110 (e.g., using compute, memory, and networking resources of the DMS 110) via a system-level user account (which may be referred to as a support user account) created by the DMS 110 for the customer. In some examples, the operator of the DMS 110 may manage the DMS 110 separate from a second computing system that is managed by the customer. In some examples, the SaaS application supported by the DMS 110 may be used to manage (e.g., protect, restore, analyze, etc.) data of the customer. In some examples, the authorization may enable the support technician to impersonate the user of the customer (with view permissions, read-only permissions, read/write permissions, etc.) while accessing the instance of the first application.

Based on receiving the authorization, the DMS 110 may receive a request from the support technician to access a second application (which may be referred to as an administrative console) running at the DMS 110. In some examples, access to the second application may be limited to particular users of the operator of the DMS 110, to particular support technicians, to particular network connections (e.g., internal network connections within the DMS 110), or any combination thereof. The second application may be configured to generate, for authorized users of the second application, a one-time credential that provides the support technician access (e.g., on a temporary basis) to the system-level user account. After authenticating the support technician and in response to the request from the support technician, the second application may provide the one-time credential to the support technician. Based on the one-time credential being provided to the support technician, the SaaS application may provide the support technician temporary access to the instance of the SaaS application running for the customer—e.g., after receiving the one-time credential received from the DMS 110.

By limiting access to the capability of accessing an instance of a SaaS application running for the customer (e.g., while impersonating a user of the customer with robust security measures), including by using one-time passwords and secure internal access flows, a likelihood of a malicious actor exploiting the impersonation capability for fraudulent means may be reduced and, in some examples, eliminated for certain threats, such as external threats.

Figure 2:
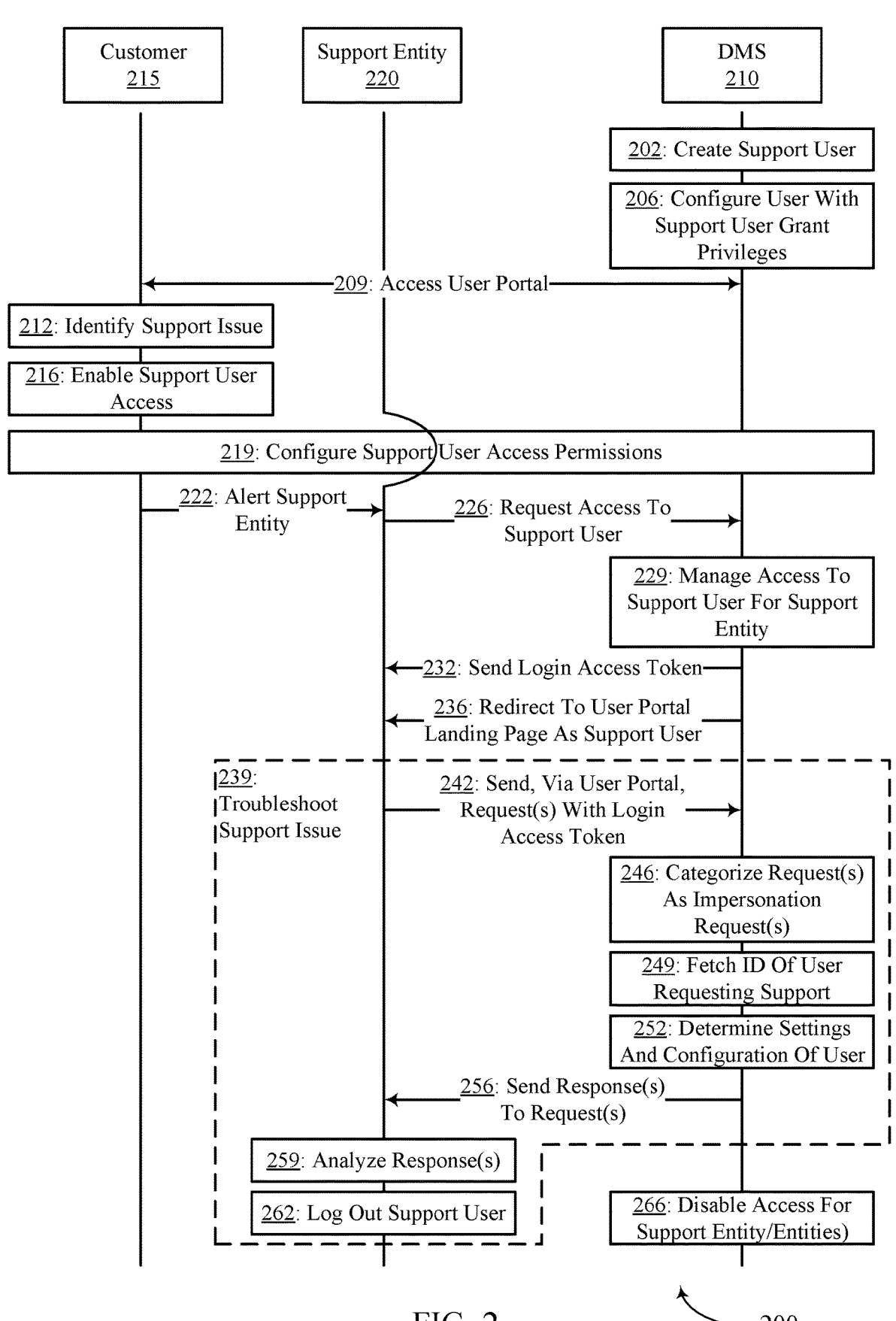
FIG. 2 shows an example of a set of operations for secured direct access for customer service in accordance with aspects of the present disclosure.

FIG. 2 shows an example of a set of operations for secured direct access for customer service in accordance with aspects of the present disclosure.

The process flow 200 may be performed by the customer 215, the support entity 220, and the DMS 210, which may be examples, of a customer, a support entity, or a DMS (e.g., the DMS 110 of FIG. 1) described herein. In some examples, the process flow 200 shows an example set of operations performed to support secured direct access for customer service. For example, the process flow 200 may include operations for gaining access to a support user to troubleshoot a customer issue with a service provided by the DMS 210.

As described herein, the DMS 210 may be configured to provide one or more SaaS applications to one or more customers. In some examples, the one or more SaaS applications are associated with one or more of storing, protecting (e.g., backing up), restoring, and analyzing data managed by the customer 215.

The support entity 220 may be a person, multiple people, a computer-based (e.g., artificial intelligence) support function, or the like.

The customer 215 may be a single-tenant or a multi-tenant customer. In some examples, when the customer 215 is a single-tenant customer, the customer 215 may include a set of users, and the DMS 210 may manage data for the set of users (e.g., in a shared location). In some examples, when the customer 215 is a multi-tenant customer, the customer 215 may include a set of users and a set of organizations (where each organization may include a set of users), and the DMS 210 may manage data for the set of organizations (e.g., in a shared location). For multi-tenant customers, the data managed by the DMS 210 for a particular organization may only be accessible by users of that organization.

The DMS 210 may create a set of user accounts for the users of the customer 215. In some examples, the DMS 210 may create one or more first user accounts with first privileges (e.g., user-level privileges), one or more second user accounts with second privileges (e.g., admin-level privileges), one or more third user accounts with third privileges, and so on. The users may use the user accounts to access the one or more SaaS applications provided by the DMS 210. In some examples, the users may use the user accounts to gain access to respective user portals supported by the one or more SaaS applications. In some examples, aspects of the user portals (e.g., the look and feel, the graphical user interface configuration, the data and computing assets accessible to the users) may be common to one or more of the users of the customer 215. In some examples, one or more of the aspects of the user portals may be unique to a user (e.g., to a user that has customized aspects of the user portal, to a user that has access to particular data and computing assets, etc.). In some examples, a user portal may be unique across users or organizations based on one or more of the data, applications, and computing systems being managed for a user or organization by the DMS 210.

At 202, one or more support users may be created (e.g., by the DMS 210) for the customer 215. In some examples, a support user may be created when an initial set of users (e.g., a default admin user) is created for the customer 215. In other examples, the support user may be created based on a selection by a user of the customer 215 that enables a support user. In some examples, the support user may be disabled until activation by a user of the customer 215. In other examples, the support user may be enabled but with access, by the support entity 220, being restricted as described herein. In cases where the support user is disabled and then activated, access to the support user, by the support entity 220, may be similarly restricted after the support user is activated.

At 206, a user of the customer 215 may be configured with (e.g., by the DMS 210) the capability of enabling or disabling the support user. In some examples, certain users of the customer 215 (e.g., users with administrative privileges) are configured with the capability of enabling or disabling the support user. For example, users with administrative privileges may be assigned a role (e.g., the GRANT_SUPPORT_ACCESS_ROLE) that enables those users to enable or disable (or enable or disable access to) the support user of the customer 215. The DMS 210 may only permit users that have been assigned this role to enable or disable the support user of the customer 215.

At 209, a user portal (e.g., for accessing a SaaS application of the DMS 210) may be accessed (e.g., by a user of the customer 215). Based on accessing the user portal, the customer 215 may initiate one or more processes and services of the SaaS application, may access data managed by the SaaS application, may customize aspects of the SaaS application, may add data or computing assets to the SaaS application, and the like. In some examples, the user portal being access by the user of the customer 215 is unique to the user or a set of users (e.g., relative to other users or sets of users of the customer 215), unique to the customer 215 (e.g., relative to other customers), or both.

At 212, an issue associated with accessing the SaaS application may be experienced (e.g., by the user of the customer 215). In some examples, the user of the customer 215 may experience an issue when attempting to add data to the SaaS application, accessed data stored in the SaaS application, change a configuration of the SaaS application, use a service provided by the SaaS application, etc. In some examples, the user of the customer 215 may contact (e.g., via a phone call, an instant messaging feature, electronic mail, etc.) the support entity 220 based on experiencing the issue with the SaaS application. In some examples, the support entity 220 may request that the user enable the support user.

At 216, access to the support user may be enabled (e.g., by the user of the customer 215). In some examples, access to the support user may be enabled based on selecting a help icon on the user portal. After selecting the help icon, an option for enabling the support user may be provided (e.g., if the user has been assigned the GRANT_SUPPORT_AC-CESS_ROLE). Based on selecting the option for enabling the support user, the user may be presented with an option of configuring access permissions for the support user to the data accessible by the user (e.g., view permissions, read-only permissions, read/write permissions, etc.). Additionally, or alternatively, the user may be presented with an option for setting a time at which the access granted to the support user expires, at which point access for all support entities of the DMS 210 may be automatically revoked.

At 219, access permissions for the support user may be configured (e.g., by the DMS 210). The access permissions may be configured in accordance with the selection of the user. In some examples, the support user may be configured to have read-only permissions to the data of the user based on the user providing read-only access for the support user. In other examples, the support user may be configured to have read/write permissions to the data of the user based on the user providing read/write access for the support user. In some examples, support user may be configured to have access (e.g., in accordance with the access permissions selected by the user) to an organization of which the user is a part. In some examples, the support user may be enabled (if the support user is currently in a disabled state) based on the user enabling access to the support user.

At 222, the support entity 220 may be alerted that access to the support user has been enabled by the user of the customer 215. In some examples, the customer 215 may alert the support entity 220 via a phone call or electronic message. In other examples, the support entity 220 may be automatically alerted (e.g., by the DMS 210) that access to the support user has been enabled for the customer 215.

At 226, access to the support user may be requested (e.g., by the support entity 220 from the DMS 210). In some examples, the request includes an indication of the user that enabled the support user, the support entity requesting access, the permissions assigned to the support user by the user requesting support, and the like. In some examples, multiple support entities may request (e.g., concurrently) access to the support user.

At 229, the access to the support user (for one or more support entities) may be managed (e.g., by the DMS 210). In some examples, after authenticating the support entity 220, the DMS 210 may assign the support entity 220 a role that controls the access of the support entity 220 to the SaaS application. For example, the DMS 210 may assign a role_id that is designated as "support" and appended with a random unique identifier; an org_id that indicates the organization of the user of the customer 215 requesting support; and access permissions (e.g., view permissions, read-only permissions, read/write permissions, etc.). In some examples, multiple support users may be generated for multiple support entities (including the support entity 220) that are used to service the support request from the user of the customer 215. Techniques for requesting and managing access to a support user are described in more detail herein, including with reference to the operations described at 316 through 349 of FIG. 3.

In some examples, the support user to be accessed by the support entity 220 is generated (or enabled if already generated) after the support entity 220 is authenticated by the administrative console.

At 232, a login access token may be sent to the support entity 220 (e.g., from the DMS 210). The login access token may be sent to the support entity 220 as a result of a successful completion of the procedure for managing access to support user. The login access token may include one or more of an indication of a time when the login access token was generated, a time when the login access token expires (e.g., hours or days after issuance of login access token), an email of the user requesting support, an account of the user requesting support, and organization associated with the user (e.g., if the customer 215 is a multi-tenant customer), a connection type for requests sent with the login access token, a user name of the support entity 220. In some examples, the login access token may be stored within a cache of a browser of the support entity 220.

The login access token may be a JSON web token. An example login access token may be structured as follows:

```
{
    Subject: support_user_ID (which may correspond to
        the role_id assigned to the support entity 220)
    Audience: https://int.hostname.com/
    Issuer: https://int.hostname.com/
    Issued_at: Login Access Token generation time (mm/
        dd/yy; ##:## AM/PM UTC)
    Expire_at: Login Access Token expiration time—
        Login Access Token generation time+expiration
        time duration (mm/dd/yy; ##:## AM/PM UTC)
    Email: support_user_email (e.g., the email for the
        support entity 220)
    Account: customer account name (e.g., name of the
        customer 215)
    Org_ID: Organization Identifier (e.g., corresponding to
        the user of the customer 215)
    Connection_Type: "support"
    User_name: support_staff_email (e.g., the email for the
        support entity 220)
}
```

At 236, the support entity 220 may be redirected (e.g., by the DMS 210) to a landing page of a user portal of the user requesting support. The landing page displayed to the support entity 220 may mirror the landing page that is (or would be) displayed to the user requesting support when the user logged into the SaaS application. For example, the landing page displayed to the support entity 220 may mirror the customizations and configurations (e.g., the user interface and system-level configurations) of the user portal established by the user requesting support.

At 239, the issue being reported by the user of the customer 215 may be troubleshot (e.g., by the support entity 220). For example, the support entity 220 may attempt to recreate the issue being experienced by the user.

At 242, a recreation of the issue being reported may attempted (e.g., by the support entity 220) by sending one or more requests to the SaaS application via the user portal (e.g., by manipulating the user portal, providing inputs to the user portal, initiating services via the user portal, etc.). The requests (e.g., each request) sent by the support entity 220 may include the login access token.

At 246, the requests received from the support entity 220 may be categorized (e.g., by the DMS 210) as impersonation requests—e.g., based on the requests including a "support" connection type.

At 249, an identifier of the user requesting support may be obtained (e.g., by the DMS 210). In some examples, the identity of the user is determined based on determining a correspondence between an identity of the support user (extracted from the login access token) and the user that enabled the support user.

At 252, settings and configurations of the SaaS application configured by the user requesting support may be determined (e.g., by the DMS 210). In some examples, the setting and configurations may be determined based on determining the identity of the user. The settings and configurations may include user interface customizations, customized configurations for particular services, customized configurations for the SaaS application, services running for the user, resources and services available to the user, etc.

At 256, responses to the requests may be sent (e.g., by the SaaS application). Based on determining the settings and configurations of the user requesting support, the responses may be returned to the support entity 220 in accordance with the determined settings and configurations. Accordingly, the responses of the SaaS application to the requests received from the support entity 220 may mirror the responses that would be provided to the user requesting support were that user to have sent the requests to the SaaS application. Thus, the support entity 220 may impersonate (from a device of the support entity 220) the user requesting support and have a common experience (at a device-level) with the user reporting the support issue.

In some examples, the responses may be determined based on the permissions granted to the support entity 220 by the user requesting support. For example, if the support entity 220 was granted read-only access, the DMS 210 may refrain from executing any requests from the support entity 220 that involve writing (e.g., changing or adding) data managed for the user requesting support.

At 259, the responses of the SaaS application may be analyzed (e.g., by the support entity 220). Based on analyzing the response, the support entity 220 may resolve the support issue, coordinate with the user requesting support to resolve the support issue; open a support incident if the support issue is unable to be resolved, and the like.

At 262, after analyzing the issue, access to the support user may be logged out of (e.g., by the support entity 220). In some examples, based on logging out of the support user, the access of the support entity 220 to the support user may be revoked by the DMS 210. Revoking the access of the support entity 220 may involve invalidating the login access token issued to the support entity 220 for access to the support user.

At 266, access to the support entity 220 (e.g., expired or revoked access(es)) may be disabled (e.g., by the DMS 210). In some examples, the support entity 220 may periodically (e.g., on a minute or hourly-basis) check for and disable expired support user access sessions. In other examples, the support entity 220 may be triggered to disable all support user access sessions (e.g., as a result of the user requesting support disabling access to the support user). Expiring support user access sessions may include invalidating the login access tokens that are currently assigned to the support entities having access to the SaaS application as support users.

Aspects of the process flow 200 may be implemented by a controller, among other components. Additionally, or alternatively, aspects of the process flow 200 may be implemented as instructions stored in memory (e.g., firmware stored in a memory coupled with a controller). For example, the instructions, when executed by a controller, may cause the controller to perform the operations of the process flow 200.

One or more of the operations described in the process flow 200 may be performed earlier or later, omitted, replaced, supplemented, or combined with another operation. Also, additional operations described herein may replace, supplement or be combined with one or more of the operations described in the process flow 200.

Figure 3:
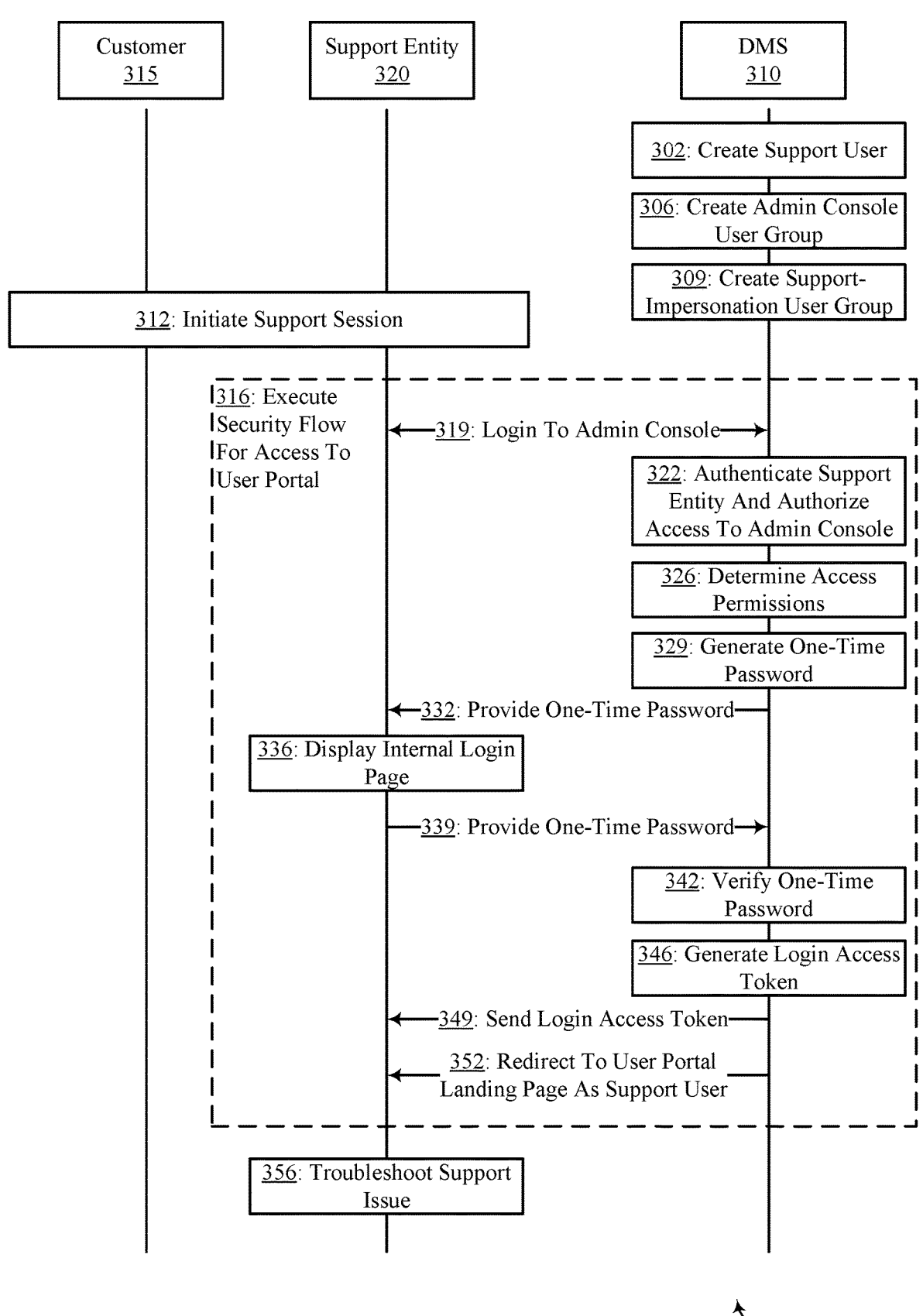
FIG. 3 shows an example of a set of operations for secured direct access for customer service in accordance with aspects of the present disclosure.

FIG. 3 shows an example of a set of operations for secured direct access for customer service in accordance with aspects of the present disclosure.

The process flow 300 may be performed by the customer 315, the support entity 320, and the DMS 310, which may be respective examples of a customer (e.g., the customer 215 of FIG. 2), a support entity (e.g., the support entity 220 of FIG. 2), and a DMS (e.g., the DMS 210 of FIG. 2 and the DMS 110 of FIG. 1. In some examples, the process flow 300 shows an example set of operations performed to support secured direct access for customer service. For example, the process flow 300 may include operations for securely gaining, by a support entity, access to a support user that enables the support entity to access an instance of a SaaS application running for a customer.

At 302, a support user may be created—e.g., as similarly described herein, including with reference to the operations described at 202 of FIG. 2.

At 306, a first group of users (e.g., employees or contractors) of the operator of the DMS 310 may be created that has access to an administrative console supported by the DMS 310.

At 309, a second group of users (e.g., employees or contractors) of the operator of the DMS 310 may be created that is permitted to impersonate a user to provide technical support. In some examples, one or more of the users may be included in both the first group of users and the second group of users. In some examples, only users included in both the first group of users and the second group of users will be authorized by the DMS 310 to impersonate a user.

At 312, a support session (that involves a support user impersonating a user requesting support) may be initiated—e.g., as similarly described herein, including with reference to the operations described at 212 through 222 of FIG. 2.

At 316, a security flow for gaining access to the user portal of the user requesting support may be executed.

At 319, the administrative console may be logged into (e.g., by one or more support entities, including the support entity 320). Logging into the administrative console may include entering (via a browser running at a device of the support entity 320) the credentials of the support entity 320 into a login page for the administrative console. In some examples, the login page of the administrative console may only be accessible within a local network of the operator of the DMS 310. The administrative console may authorize the support entity 320 for access to the administrative console after authenticating the credentials inputted into the login page. In some examples, as part of logging into the administrative console, the support entity 320 may send a one-time access token to the administrative console. The one-time access token may include an indication of the user that is seeking support, an organization associated with the user seeking support, an identity of the support entity 320, an identity of the support user, and the like.

At 322, the support entity 320 may be authenticated and authorized for access to the administrative console—e.g., based on the credentials inputted by the support entity 320. In some examples, the administrative console may provide the support entity 320 access to the administrative console based on the support entity 320 supplying credentials that are permitted to access the administrative console. After logging into the administrative console, the support entity 320 may initiate a procedure for generating a one-time password for accessing the support user. In some examples, the procedure for generating the one-time password may be initiated automatically after the support entity 320 logs in—e.g., in accordance with the one-time access token provided by the support entity 320. In some examples, as part of the procedure for generating the one-time password, the administrative console may confirm that the support entity 320 is a part of a group that is permitted to impersonate users in a support capacity. In some examples, the administrative console may use a secret signing key associated with granting support entities access to the SaaS application running for the customer 315 that can be used to verify that a one-time password was generated by the administrative console.

At 326, access permissions for the support entity 320 to access the data of the user requesting support may be determined (e.g., by the administrative console). In some examples, the administrative console may determine (e.g., via the one-time access token) that the support entity 320 has been granted read-only access to the data of the user requesting support. In other examples, the administrative console may determine that the support entity 320 has been granted read/write access to the data of the user requesting support.

At 329, a one-time password for gaining access to the support user may be generated—e.g., in accordance with the identity of the support entity 320, the identity of the user requesting support, the identity of the support user, the access permissions granted to the support entity 320, and the like. In some examples, the one-time password is generated to expire after a period of time (e.g., after minutes) elapses. The one-time password may include one or more of a token identifier that is unique (and used to verify the one-time password), a time when the one-time password is issued, a time when the one-time password expires, an identity of the customer 315, an identity for uniquely identify access request, an identity of the support entity 320.

The one-time password may be a JSON web token. An example one-time password may be structured as follows:

```
{
    Issuer: https://int.hostname.com/
    Audience: https://int.hostname.com/
    Id: Token Identifier (unique for one-time password)
    IssuedAt: One-Time Password generation time (mm/
        dd/yy; ##:## AM/PM UTC)
    ExpireAt: One-Time Password Token expiration
        time—Login Access Token generation time+expira-
        tion time duration (mm/dd/yy; ##:##AM/PM UTC)
    Account: customer account name (e.g., name of the
        customer 315)
    SupportAccessID: Identifier for uniquely identifying
        grant support access
    SupportUserEmail: support_staff_email (e.g., the email
        for the support entity 320)
}
```

In some examples, the one-time password may be signed by the secret cryptographic key generated by the administrative console.

At 332, the one-time password may be provided (e.g., by the administrative console) to the support entity 320. In some examples, the administrative console also redirects a browser of the support entity 320 to an internal login page for accessing the SaaS application running for the customer 315 via the support user. The internal login page may only be accessible via devices that are connected to a local network managed by the operator of the DMS 310.

At 336, an internal login page that enables access to the SaaS application running for the customer 315 via the support user may be displayed at a browser of the support entity 320. The internal login page may be accessible within a network of an operator of the DMS 310. In some examples, the internal login page may also be accessible a network of an operator of the DMS 310 that is accessed via a virtual public network of the operator of the DMS 310.

At 339, the one-time password may be inputted (e.g., by the support entity 320) into the internal login page. In some examples, the one-time password may be inputted at a time that precedes the expiration of the one-time password. In other examples, the one-time password may be inputted at a time that follows the expiration of the one-time password.

At 342, the one-time password may be verified (e.g., by the DMS 310). Verifying the one-time password may include determining whether the one-time password was received at a time that precedes expiration of the one-time password and determining whether the provided token identifier matches a stored token identifier that provides access to the support user. If the one-time password has not expired and includes a token identifier that matches the stored token identifier, the one-time password may be verified.

At 346, based on successfully verifying the one-time password, a login access token may be generated that provides access to the support user for a period of time. The login access token may be structured as described herein—e.g., including with reference to 232 of FIG. 2. In some examples, based on successfully verifying the one-time password, the DMS 310 may generate the one-time password based on a determined correspondence between the user requesting support and the support user, the access permissions granted to the support entity 320 by the user requesting support, a customer associated with the user requesting support, an organization associated with the user requesting support, or any combination thereof.

At 349, a login access token may be sent (e.g., by the DMS 310) to the support entity 320—e.g., as similarly described herein, including with reference to the operations described at 232 of FIG. 2.

At 352, the support entity 320 may be redirected (e.g., by the DMS 310) to a landing page of a user portal of the user requesting support—e.g., as similarly described herein, including with reference to the operations described at 236 of FIG. 2.

At 356, the issue being reported by the user requesting support may be troubleshot (e.g., by the support entity 320)—e.g., as similarly described herein, including with reference to the operations described at 239 through 262 of FIG. 2. As part of troubleshooting the issue, the support entity 320 may access (via the support user) a user access portal of the user requesting support may be accessed using the login access token—e.g., as similarly described herein, including with reference to the operations described at 242 through 256 of FIG. 2.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
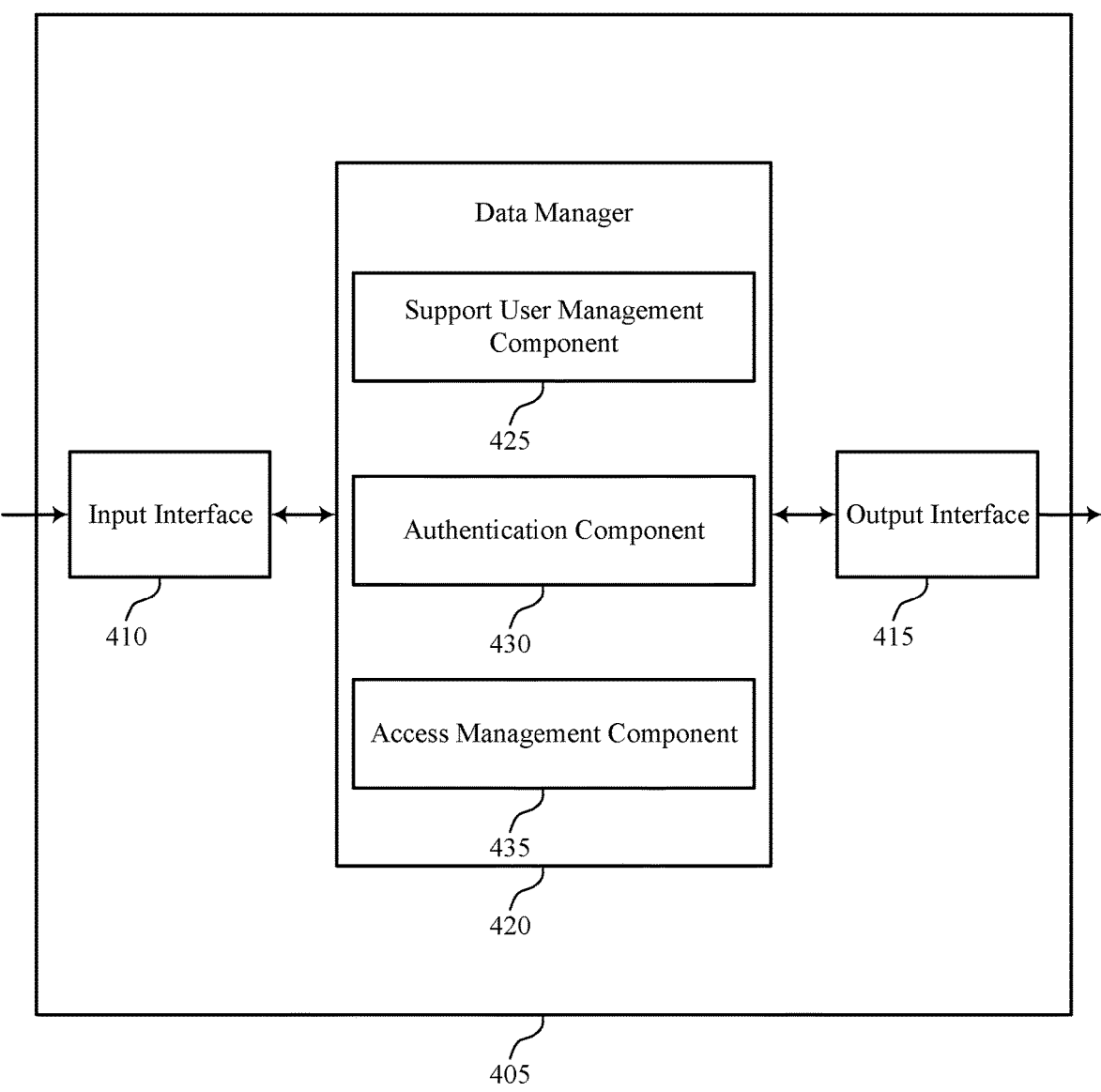
FIG. 4 shows a block diagram of an apparatus that supports secured direct access for customer service in accordance with aspects of the present disclosure.

FIG. 4 shows a block diagram 400 of a system 405 that supports secured direct access for customer service in accordance with aspects of the present disclosure. In some examples, the system 405 may be an example of aspects of one or more components described with reference to FIG. 1, such as a DMS 110. The system 405 may include an input interface 410, an output interface 415, and a data manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data manager 420 to support secured direct access for customer service. In some cases, the input interface 410 may be a component of a network interface 625 as described with reference to FIG. 6.

The output interface 415 may manage output signaling for the system 405. For example, the output interface 415 may receive signaling from other components of the system 405, such as the data manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the data manager 420 may include a support user management component 425, an authentication component 430, an access management component 435, or any combination thereof. In some examples, the data manager 420, or various components thereof, may be configured to perform various operations (e.g., receiving, monitoring, transmitting) using or otherwise in cooperation with the input interface 410, the output interface 415, or both. For example, the data manager 420 may receive information from the input interface 410, send information to the output interface 415, or be integrated in combination with the input interface 410, the output interface 415, or both to receive information, transmit information, or perform various other operations as described herein.

The support user management component 425 may be configured as or otherwise support a means for receiving, at a first computing system that is managed by an operator and separate from a second computing system that is managed by a customer of the operator, from a user of the customer, authorization to access an instance of a first application running at the first computing system for the customer via a user account for the customer. The authentication component 430 may be configured as or otherwise support a means for receiving, based on the authorization, a request from a user of the operator to access a second application associated with generating a one-time credential associated with the user account, the second application running at the first computing system. The authentication component 430 may be configured as or otherwise support a means for providing, based on authenticating the user of the operator for access to the second application, the one-time credential associated with the user account to the user of the operator. The access management component 435 may be configured as or otherwise support a means for granting, based on the one-time credential, the user of the operator temporary access to the instance of the first application via the user account.

Figure 5:
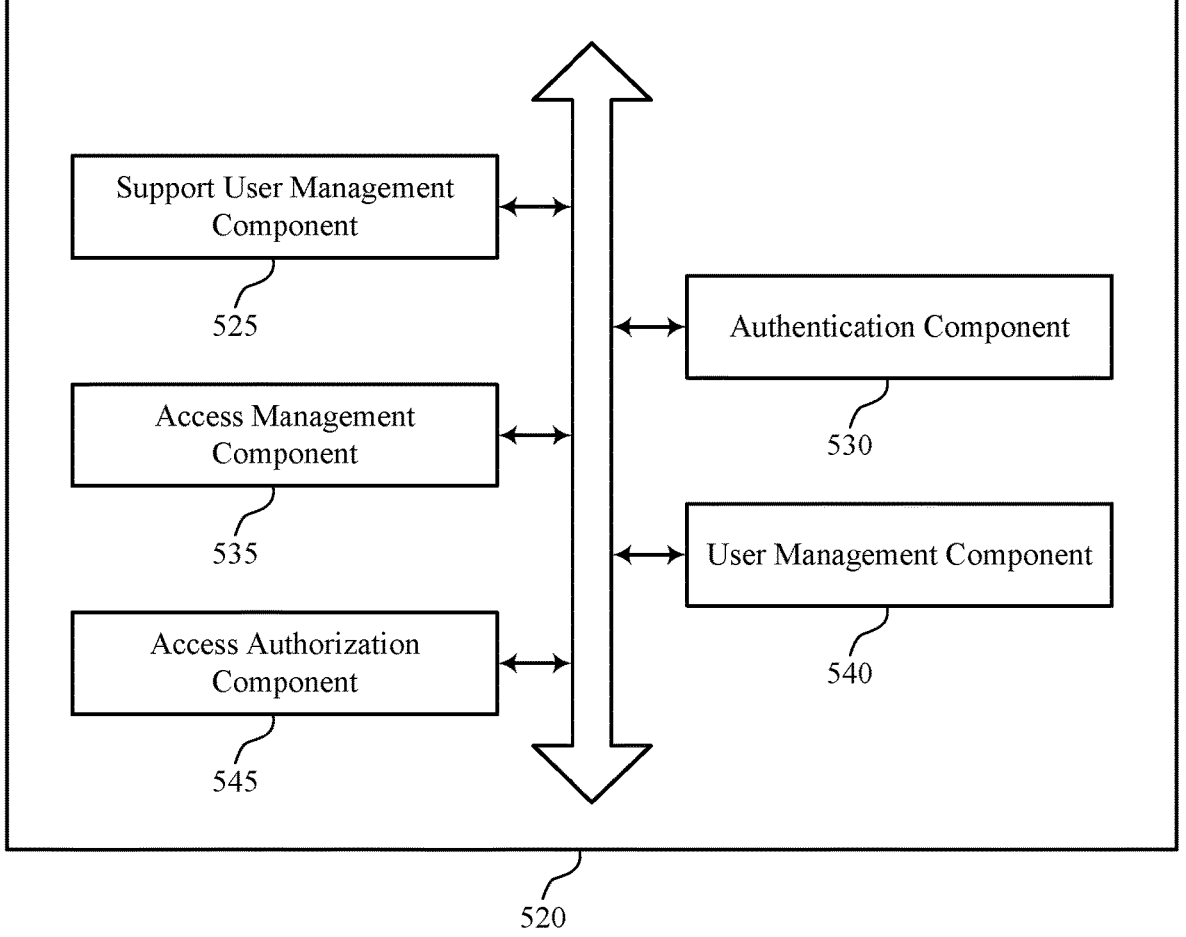
FIG. 5 shows a block diagram of a data manager that supports secured direct access for customer service in accordance with aspects of the present disclosure.

FIG. 5 shows a block diagram 500 of a data manager 520 that supports secured direct access for customer service in accordance with aspects of the present disclosure. The data manager 520 may be an example of aspects of a data manager or a data manager 420, or both, as described herein. The data manager 520, or various components thereof, may be an example of means for performing various aspects of secured direct access for customer service as described herein. For example, the data manager 520 may include a support user management component 525, an authentication component 530, an access management component 535, a user management component 540, an access authorization component 545, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The support user management component 525 may be configured as or otherwise support a means for receiving, at a first computing system that is managed by an operator and separate from a second computing system that is managed by a customer of the operator, from a user of the customer, authorization to access an instance of a first application running at the first computing system for the customer via a user account for the customer. The authentication component 530 may be configured as or otherwise support a means for receiving, based on the authorization, a request from a user of the operator to access a second application associated with generating a one-time credential associated with the user account, the second application running at the first computing system. In some examples, the authentication component 530 may be configured as or otherwise support a means for providing, based on authenticating the user of the operator for access to the second application, the one-time credential associated with the user account to the user of the operator. The access management component 535 may be configured as or otherwise support a means for granting, based on the one-time credential, the user of the operator temporary access to the instance of the first application via the user account.

In some examples, the user management component 540 may be configured as or otherwise support a means for creating, prior to receiving the authorization to access the instance of the first application, a first user group that has access to the second application and a second user group that is permitted to impersonate users of the customer.

In some examples, the authentication component 530 may be configured as or otherwise support a means for authenticating the user of the operator for access to the second application based on the user of the operator being included in a first user group that has access to the second application and in a second user group that is permitted to impersonate users of the customer.

In some examples, the access management component 535 may be configured as or otherwise support a means for determining, based on authenticating the user of the operator for access to the second application, permissions for access-ing the instance of the first application granted to the user of the operator by the user of the customer, where the user of the operator is granted temporary access to the instance of the first application via the user account in accordance with the permissions.

In some examples, the authentication component 530 may be configured as or otherwise support a means for generat-ing, based on authenticating the user of the operator for access to the second application, the one-time credential, where the one-time credential includes a unique string, a time the one-time credential was issued, a time the one-time credential expires, an identifier of the user of the customer, an identifier of the user of the operator, an identifier of the authorization to access the instance of the first application, or any combination thereof.

In some examples, the authentication component 530 may be configured as or otherwise support a means for signing a JSON web token with a private key associated with granting users of the operator temporary access to the instance of the first application, where the one-time credential includes the JSON web token.

In some examples, the access authorization component 545 may be configured as or otherwise support a means for receiving, at a portal that is associated with the instance of the first application, based on providing the one-time cre-dential to the user of the operator, the one-time credential from the user of the operator, where access to the portal is limited to requests originating within a network of the first computing system.

In some examples, the access authorization component 545 may be configured as or otherwise support a means for verifying, based on receiving the one-time credential from the user of the operator, the one-time credential. In some examples, the access authorization component 545 may be configured as or otherwise support a means for generating, based on verifying the one-time credential, a token associ-ated with accessing the user account.

In some examples, the customer supports a set of multiple organizations, and the token includes a time the token was issued, a time the token expires, an identifier of the user of the customer, an identifier of the user of the operator, an identifier of the user account, an identifier of an organization of the set of multiple organizations to which the user of the customer belongs, a connection type associated with access-ing the instance of the first application using the token, or any combination thereof.

In some examples, the access authorization component 545 may be configured as or otherwise support a means for verifying, based on receiving the one-time credential from the user of the operator, the one-time credential. In some examples, the access authorization component 545 may be configured as or otherwise support a means for redirecting, based on verifying the one-time credential, the user of the operator to a landing page of a user portal for the user account, a configuration of the landing page of the user portal for the user account corresponding to a configuration of a landing page of a user portal for a second user account for the customer that is associated with the user of the customer.

Figure 6:
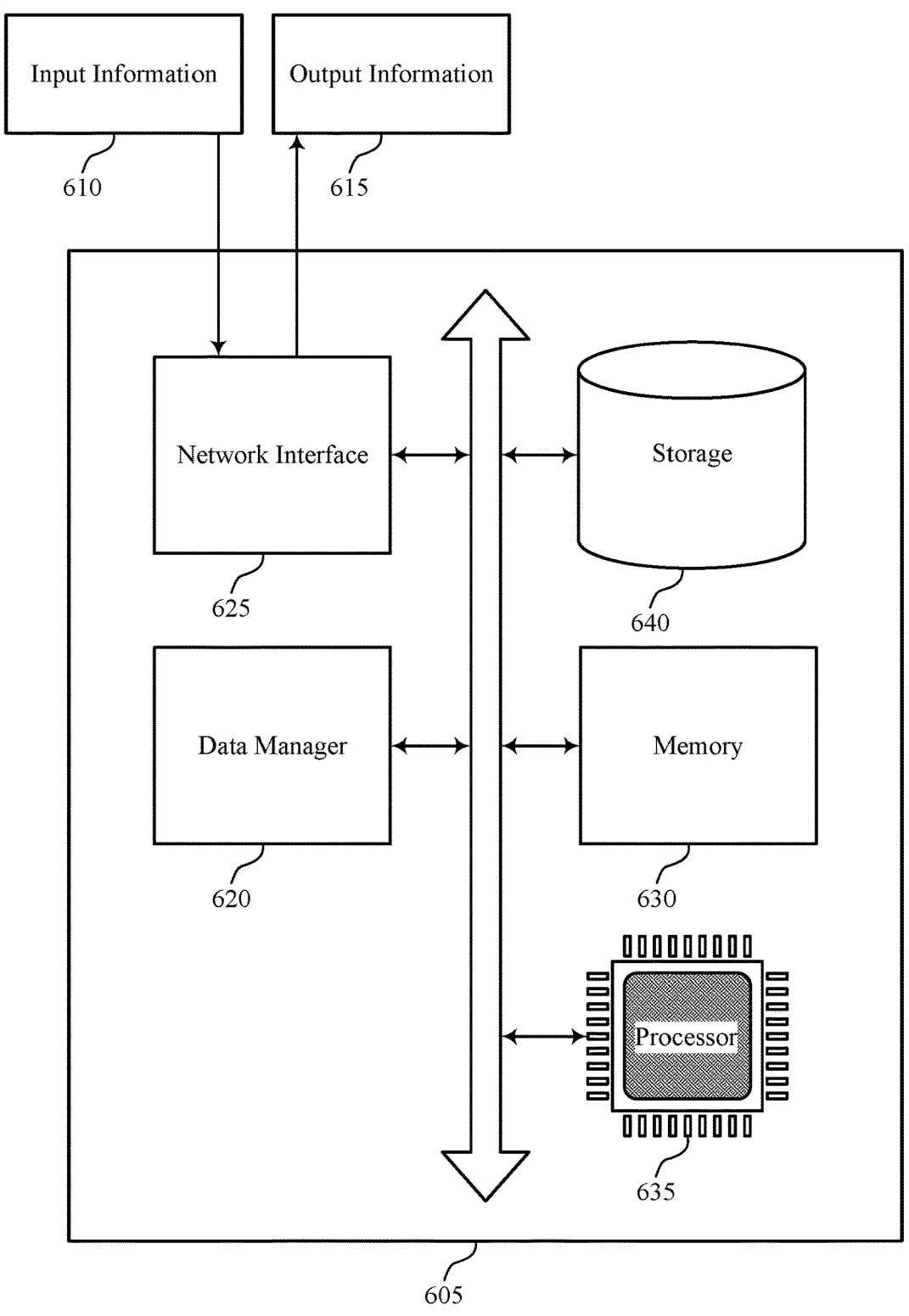
FIG. 6 shows a diagram of a system including a device that supports secured direct access for customer service in accordance with aspects of the present disclosure.

FIG. 6 shows a block diagram 600 of a system 605 that supports secured direct access for customer service in accor-dance with aspects of the present disclosure. The system 605 may be an example of or include the components of a system

405 as described herein. The system 605 may include components for data management, including components such as a data manager 620, an input information 610, an output information 615, a network interface 625, at least one memory 630, at least one processor 635, and a storage 640. These components may be in electronic communication or otherwise coupled with each other (e.g., operatively, com-municatively, functionally, electronically, electrically; via one or more buses, communications links, communications interfaces, or any combination thereof). Additionally, the components of the system 605 may include corresponding physical components or may be implemented as correspond-ing virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-ex-ecutable software including instructions that, when executed, cause the processor 635 to perform various func-tions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., func-tions or tasks supporting secured direct access for customer service). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the sys-tem 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the data manager 620 may be configured as or otherwise support a means for receiving, at a first computing system that is managed by an operator and separate from a second computing system that is managed by a customer of the operator, from a user of the customer, authorization to access an instance of a first application running at the first computing system for the customer via a user account for the customer. The data manager 620 may be configured as or otherwise support a means for receiving, based on the authorization, a request from a user of the operator to access a second application associated with generating a one-time credential associated with the user account, the second application running at the first computing system. The data manager 620 may be configured as or otherwise support a means for providing, basing at least in part on authenticating the user of the operator for access to the second application, the one-time credential associated with the user account to the user of the operator. The data manager 620 may be configured as or otherwise support a means for granting, based on the one-time credential, the user of the operator temporary access to the instance of the first application via the user account.

By including or configuring the data manager 620 in accordance with examples as described herein, the system 605 may support techniques for secured direct access for customer service, which may provide one or more benefits such as, for example, reducing and, in some examples, eliminating for certain threats (such as external threats) the likelihood of a malicious actor exploiting the impersonation capability for fraudulent means, among other possibilities.

FIG. 7 shows a flowchart illustrating a method 700 that supports secured direct access for customer service in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, at a first computing system that is managed by an operator and separate from a second computing system that is managed by a customer of the operator, from a user of the customer, authorization to access an instance of a first application running at the first computing system for the customer via a user account for the customer. The operations of 705 may be performed in accordance with examples as disclosed herein. In some examples, aspects of the operations of 705 may be performed by a support user management component 525 as described with reference to FIG. 5.

At 710, the method may include receiving, based on the authorization, a request from a user of the operator to access a second application associated with generating a one-time credential associated with the user account, the second application running at the first computing system. The operations of 710 may be performed in accordance with examples as disclosed herein. In some examples, aspects of the operations of 710 may be performed by an authentication component 530 as described with reference to FIG. 5.

At 715, the method may include providing, based on authenticating the user of the operator for access to the second application, the one-time credential associated with the user account to the user of the operator. The operations of 715 may be performed in accordance with examples as disclosed herein. In some examples, aspects of the operations of 715 may be performed by an authentication component 530 as described with reference to FIG. 5.

At 720, the method may include granting, based on the one-time credential, the user of the operator temporary access to the instance of the first application via the user account. The operations of block 720 may be performed in accordance with examples as disclosed herein. In some examples, aspects of the operations of 720 may be performed by an access management component 535 as described with reference to FIG. 5.

A method by an apparatus is described. The method may include receiving, at a first computing system that is managed by an operator and separate from a second computing system that is managed by a customer of the operator, from a user of the customer, authorization to access an instance of a first application running at the first computing system for the customer via a user account for the customer, receiving, based on the authorization, a request from a user of the operator to access a second application associated with generating a one-time credential associated with the user account, the second application running at the first computing system, providing, based on authenticating the user of the operator for access to the second application, the one-time credential associated with the user account to the user of the operator, and granting, based on the one-time credential, the user of the operator temporary access to the instance of the first application via the user account.

An apparatus is described. The apparatus may include one or more memories storing processor executable code, and one or more processors coupled with the one or more memories. The one or more processors may individually or collectively operable to execute the code to cause the apparatus to receive, at a first computing system that is managed by an operator and separate from a second computing system that is managed by a customer of the operator, from a user of the customer, authorization to access an instance of a first application running at the first computing system for the customer via a user account for the customer, receive, based on the authorization, a request from a user of the operator to access a second application associated with generating a one-time credential associated with the user account, the second application running at the first computing system, providing, base at least in part on authenticating the user of the operator for access to the second application, the one-time credential associated with the user account to the user of the operator, and grant, based on the one-time credential, the user of the operator temporary access to the instance of the first application via the user account.

Another apparatus is described. The apparatus may include means for receiving, at a first computing system that is managed by an operator and separate from a second computing system that is managed by a customer of the operator, from a user of the customer, authorization to access an instance of a first application running at the first computing system for the customer via a user account for the customer, means for receiving, based on the authorization, a request from a user of the operator to access a second application associated with generating a one-time credential associated with the user account, the second application running at the first computing system, means for providing, based on authenticating the user of the operator for access to the second application, the one-time credential associated with the user account to the user of the operator, and means for granting, based on the one-time credential, the user of the operator temporary access to the instance of the first application via the user account.

A non-transitory computer-readable medium storing code is described. The code may include instructions executable by one or more processors to receive, at a first computing system that is managed by an operator and separate from a second computing system that is managed by a customer of the operator, from a user of the customer, authorization to access an instance of a first application running at the first computing system for the customer via a user account for the customer, receive, based on the authorization, a request from a user of the operator to access a second application associated with generating a one-time credential associated with the user account, the second application running at the first computing system, providing, base at least in part on authenticating the user of the operator for access to the second application, the one-time credential associated with the user account to the user of the operator, and grant, based on the one-time credential, the user of the operator temporary access to the instance of the first application via the user account.

Some examples of the method, apparatus, and non-transitory computer-readable medium described herein may further include operations, features, means, or instructions for creating, prior to receiving the authorization to access the instance of the first application, a first user group that may have access to the second application and a second user group that may be permitted to impersonate users of the customer.

Some examples of the method, apparatus, and non-transitory computer-readable medium described herein may further include operations, features, means, or instructions for authenticating the user of the operator for access to the second application based on the user of the operator being included in a first user group that may have access to the second application and in a second user group that may be permitted to impersonate users of the customer.

Some examples of the method, apparatus, and non-transitory computer-readable medium described herein may further include operations, features, means, or instructions for determining, based on authenticating the user of the operator for access to the second application, permissions for accessing the instance of the first application granted to the user of the operator by the user of the customer, where the user of the operator may be granted temporary access to the instance of the first application via the user account in accordance with the permissions.

Some examples of the method, apparatus, and non-transitory computer-readable medium described herein may further include operations, features, means, or instructions for generating, based on authenticating the user of the operator for access to the second application, the one-time credential, where the one-time credential includes a unique string, a time the one-time credential was issued, a time the one-time credential expires, an identifier of the user of the customer, an identifier of the user of the operator, an identifier of the authorization to access the instance of the first application, or any combination thereof.

Some examples of the method, apparatus, and non-transitory computer-readable medium described herein may further include operations, features, means, or instructions for signing a JSON web token with a private key associated with granting users of the operator temporary access to the instance of the first application, where the one-time credential includes the JSON web token.

Some examples of the method, apparatus, and non-transitory computer-readable medium described herein may further include operations, features, means, or instructions for receiving, at a portal that may be associated with the instance of the first application, based on providing the one-time credential to the user of the operator, the one-time credential from the user of the operator, where access to the portal may be limited to requests originating within a network of the first computing system.

In some examples of the method, apparatus, and non-transitory computer-readable medium described herein, verifying, based on receiving the one-time credential from the user of the operator, the one-time credential and generating, based on verifying the one-time credential, a token associated with accessing the user account.

In some examples of the method, apparatus, and non-transitory computer-readable medium described herein, the customer supports a set of multiple organizations, and the token includes a time the token was issued, a time the token expires, an identifier of the user of the customer, an identifier of the user of the operator, an identifier of the user account, an identifier of an organization of the set of multiple organizations to which the user of the customer belongs, a connection type associated with accessing the instance of the first application using the token, or any combination thereof.

In some examples of the method, apparatus, and non-transitory computer-readable medium described herein, verifying, based on receiving the one-time credential from the user of the operator, the one-time credential and redirecting, based on verifying the one-time credential, the user of the operator to a landing page of a user portal for the user account, a configuration of the landing page of the user portal for the user account corresponding to a configuration of a landing page of a user portal for a second user account for the customer that may be associated with the user of the customer.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a first computing system that is managed by an operator and separate from a second computing system that is managed by a customer of the operator, from a user of the customer, authorization to access an instance of a first application running at the first computing system for the customer via a user account for the customer;
   receiving, based at least in part on the authorization, a request from a user of the operator to access a second application associated with generating a one-time credential associated with the user account, the second application running at the first computing system;
   providing, based at least in part on authenticating the user of the operator for access to the second application, the one-time credential associated with the user account to the user of the operator; and
   granting, based at least in part on the one-time credential, the user of the operator temporary access to the instance of the first application via the user account.

2. The method of claim 1, further comprising:
   creating, prior to receiving the authorization to access the instance of the first application, a first user group that has access to the second application and a second user group that is permitted to impersonate users of the customer.

3. The method of claim 1, further comprising:
   authenticating the user of the operator for access to the second application based at least in part on the user of the operator being included in a first user group that has access to the second application and in a second user group that is permitted to impersonate users of the customer.

4. The method of claim 1, further comprising:

determining, based at least in part on authenticating the user of the operator for access to the second application, permissions for accessing the instance of the first application granted to the user of the operator by the user of the customer, wherein the user of the operator is granted temporary access to the instance of the first application via the user account in accordance with the permissions.

5. The method of claim 1, further comprising:

generating, based at least in part on authenticating the user of the operator for access to the second application, the one-time credential, wherein the one-time credential comprises a unique string, a time the one-time credential was issued, a time the one-time credential expires, an identifier of the user of the customer, an identifier of the user of the operator, an identifier of the authorization to access the instance of the first application, or any combination thereof.

6. The method of claim 1, wherein the one-time credential is formatted as a JSON web token, the method further comprising:

signing the JSON web token with a private key associated with granting users of the operator temporary access to the instance of the first application.

7. The method of claim 1, further comprising:

receiving, at a portal that is associated with the instance of the first application, based at least in part on providing the one-time credential to the user of the operator, the one-time credential from the user of the operator, wherein access to the portal is limited to requests originating within a network of the first computing system.

8. The method of claim 7, further comprising:

verifying, based at least in part on receiving the one-time credential from the user of the operator, the one-time credential; and generating, based at least in part on verifying the one-time credential, a token associated with accessing the user account.

9. The method of claim 8, wherein:

the customer supports a plurality of organizations, and the token comprises a time the token was issued, a time the token expires, an identifier of the user of the customer, an identifier of the user of the operator, an identifier of the user account, an identifier of an organization of the plurality of organizations to which the user of the customer belongs, a connection type associated with accessing the instance of the first application using the token, or any combination thereof.

10. The method of claim 1, further comprising:

verifying, based at least in part on receiving the one-time credential from the user of the operator, the one-time credential; and redirecting, based at least in part on verifying the one-time credential, the user of the operator to a landing page of a user portal for the user account, a configuration of the landing page of the user portal for the user account corresponding to a configuration of a landing page of a user portal for a second user account for the customer that is associated with the user of the customer.

11. An apparatus, comprising:

one or more memories; and one or more processors, wherein the one or more memories store code comprising instructions executable, individually or collectively, by the one or more processors to cause the apparatus to:

receive, at a first computing system that is managed by an operator and separate from a second computing system that is managed by a customer of the operator, from a user of the customer, authorization to access an instance of a first application running at the first computing system for the customer via a user account for the customer;

receive, based at least in part on the authorization, a request from a user of the operator to access a second application associated with generating a one-time credential associated with the user account, the second application running at the first computing system;

provide, based at least in part on authenticating the user of the operator for access to the second application, the one-time credential associated with the user account to the user of the operator; and grant, based at least in part on the one-time credential, the user of the operator temporary access to the instance of the first application via the user account.

12. The apparatus of claim 11, wherein the instructions are further executable, individually or collectively, by the one or more processors to cause the apparatus to:

create, prior to receiving the authorization to access the instance of the first application, a first user group that has access to the second application and a second user group that is permitted to impersonate users of the customer.

13. The apparatus of claim 11, wherein the instructions are further executable, individually or collectively, by the one or more processors to cause the apparatus to:

authenticate the user of the operator for access to the second application based at least in part on the user of the operator being included in a first user group that has access to the second application and in a second user group that is permitted to impersonate users of the customer.

14. The apparatus of claim 11, wherein the instructions are further executable, individually or collectively, by the one or more processors to cause the apparatus to:

determine, based at least in part on authenticating the user of the operator for access to the second application, permissions for accessing the instance of the first application granted to the user of the operator by the user of the customer, wherein the user of the operator is granted temporary access to the instance of the first application via the user account in accordance with the permissions.

15. The apparatus of claim 11, wherein the instructions are further executable, individually or collectively, by the one or more processors to cause the apparatus to:

generate, based at least in part on authenticating the user of the operator for access to the second application, the one-time credential, wherein the one-time credential comprises a unique string, a time the one-time credential was issued, a time the one-time credential expires, an identifier of the user of the customer, an identifier of the user of the operator, an identifier of the authorization to access the instance of the first application, or any combination thereof.

16. A non-transitory, computer readable medium storing code that comprises instructions that are executable, individually or collectively, by one or more processors of a device to cause the device to:

receive, at a first computing system that is managed by an operator and separate from a second computing system that is managed by a customer of the operator, from a user of the customer, authorization to access an instance of a first application running at the first computing system for the customer via a user account for the customer;

receive, based at least in part on the authorization, a request from a user of the operator to access a second application associated with generating a one-time credential associated with the user account, the second application running at the first computing system;

provide, based at least in part on authenticating the user of the operator for access to the second application, the one-time credential associated with the user account to the user of the operator; and grant, based at least in part on the one-time credential, the user of the operator temporary access to the instance of the first application via the user account.

17. The non-transitory, computer readable medium of claim 16, wherein the instructions are further executable, individually or collectively, by the one or more processors to cause the device to:

create, prior to receiving the authorization to access the instance of the first application, a first user group that has access to the second application and a second user group that is permitted to impersonate users of the customer.

18. The non-transitory, computer readable medium of claim 16, wherein the instructions are further executable, individually or collectively, by the one or more processors to cause the device to:

authenticate the user of the operator for access to the second application based at least in part on the user of the operator being included in a first user group that has access to the second application and in a second user group that is permitted to impersonate users of the customer.

19. The non-transitory, computer readable medium of claim 16, wherein the instructions are further executable, individually or collectively, by the one or more processors to cause the device to:

determine, based at least in part on authenticating the user of the operator for access to the second application, permissions for accessing the instance of the first application granted to the user of the operator by the user of the customer, wherein the user of the operator is granted temporary access to the instance of the first application via the user account in accordance with the permissions.

20. The non-transitory, computer readable medium of claim 16, wherein the instructions are further executable, individually or collectively, by the one or more processors to cause the device to:

generate, based at least in part on authenticating the user of the operator for access to the second application, the one-time credential, wherein the one-time credential comprises a unique string, a time the one-time credential was issued, a time the one-time credential expires, an identifier of the user of the customer, an identifier of the user of the operator, an identifier of the authorization to access the instance of the first application, or any combination thereof.

* * * * *